Feb. 7, 1950   D. M. WILLIAMS   2,497,052
METHOD AND APPARATUS FOR DETERMINING THE
ELONGATION PROPERTIES OF COATING FILMS
Filed March 15, 1945   3 Sheets-Sheet 1

INVENTOR.
DAVID M. WILLIAMS,
BY Leech & Radule,
ATTORNEYS.

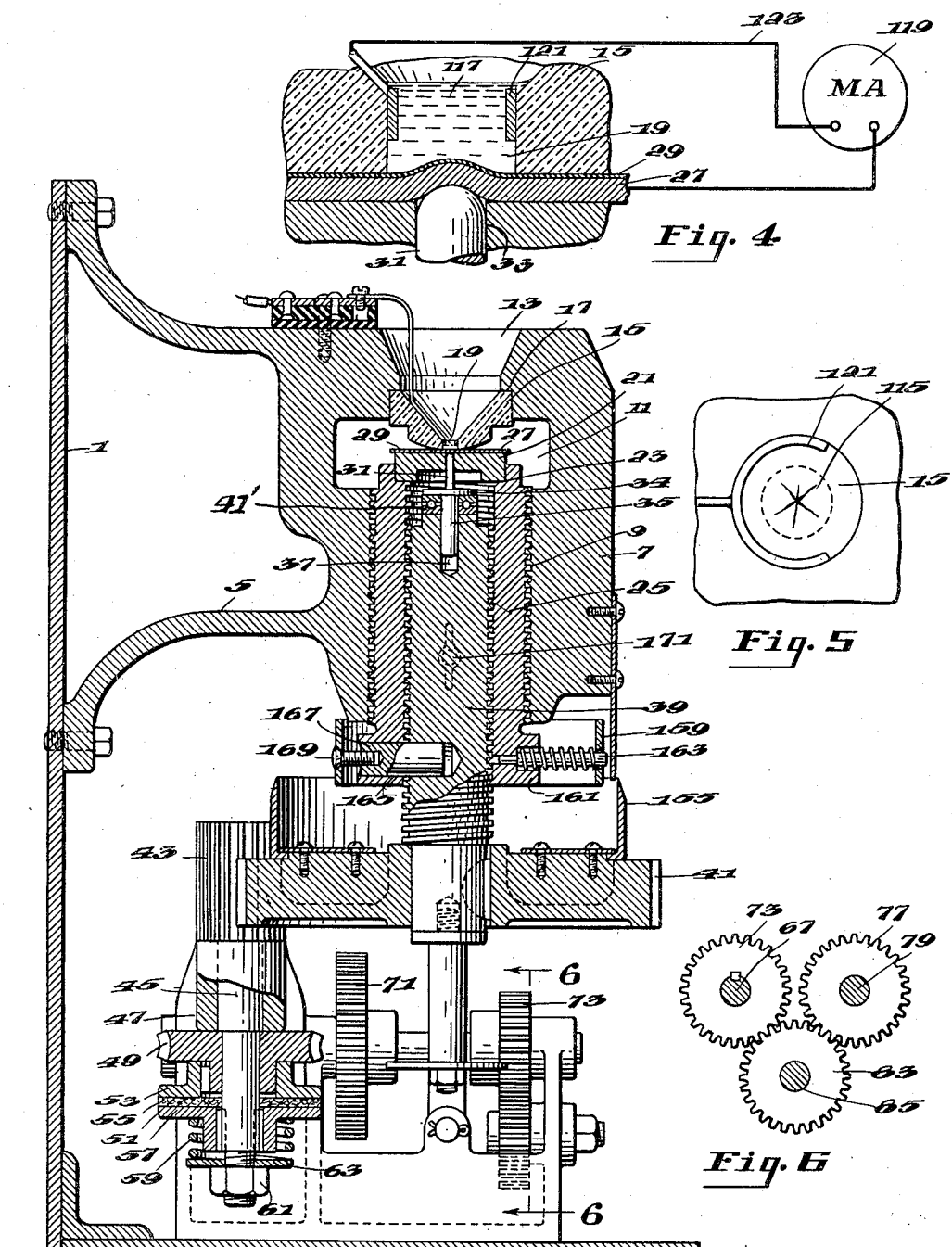

Feb. 7, 1950     D. M. WILLIAMS     2,497,052
METHOD AND APPARATUS FOR DETERMINING THE
ELONGATION PROPERTIES OF COATING FILMS
Filed March 15, 1945     3 Sheets-Sheet 3
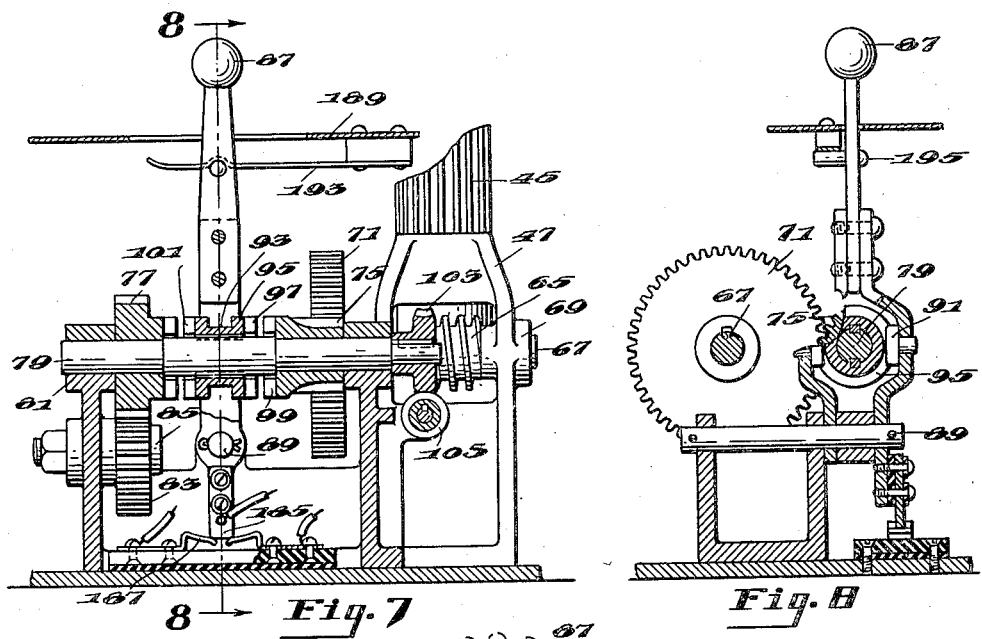
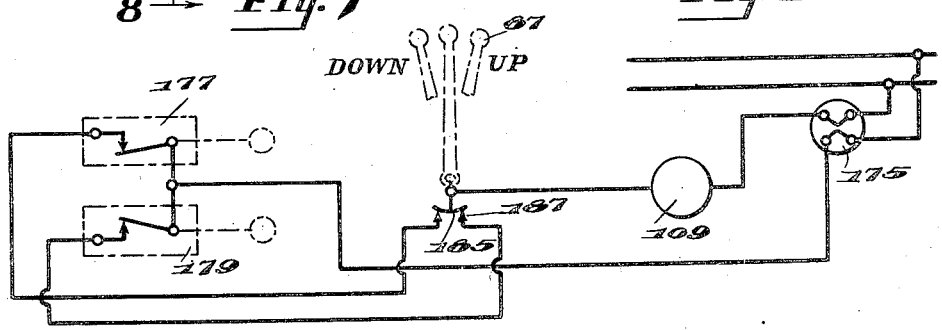
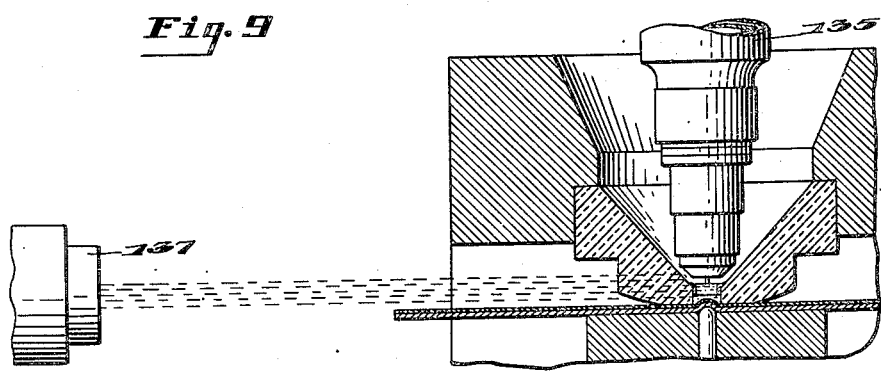
INVENTOR.
DAVID M. WILLIAMS,
BY
*Leech & Radue,*
ATTORNEYS.

Patented Feb. 7, 1950

2,497,052

UNITED STATES PATENT OFFICE 2,497,052

METHOD AND APPARATUS FOR DETERMINING THE ELONGATION PROPERTIES OF COATING FILMS

David M. Williams, Warrensville Heights, Ohio, assignor to The Arco Company, Cleveland, Ohio Application March 15, 1945, Serial No. 582,957

3 Claims. (Cl. 73—150)

This invention relates to a method and apparatus for determining the distensibility or elongation of a film of coating material, and more particularly the invention pertains to a method and machine whereby flowable, air hardened films of paint, lacquer, varnish and the like, applied to a flat metal plate, may be tested to determine the degree of distensibility or factor of elongation possessed by said films.

The use of the present method and apparatus permits the paint manufacturer to test various formulae of coating compositions to determine their elasticity or distensibility through successive stages of aging from the application of the original film on a test panel until the film is aged. The progressive testing of the elongation or elasticity of the film may be measured by electrical measuring devices and also by visual observation.

In general the method and apparatus for carrying out the steps of the method comprise applying a film of coating material to a test panel, and subjecting a limited area of the test panel with its adhering film thereon to a progressive force until the film is ruptured. Specifically, the method takes advantage of the water barrier properties of the paint or other film and the production of a galvanic cell when fissures develop in this film as the film and its backing plate are subjected to a sufficient force to distend and rupture the film. Contact is made between the underlying metal test panel and an electrode of metal having a different position in the electromotive series through the activity of an electrolyte overlying the test point on the paint film which establishes a voltaic cell when the electrolyte comes in contact with the underlying dissimilar metal of the test panel. Both the linear distensibility of the test panel and film are progressively measured and this reading correlated with a sensitive electric measuring instrument energized by the electromotive force created when the paint film initially ruptures and permits the electrolyte to contact the test panel through the fissures created in the paint film.

The data obtainable in following this method is invaluable to the paint chemist, as the separation of the paint film to a sufficient degree to develop moisture seepage therethrough, and consequent rust development on the underlying metal surface is so minute that it cannot be detected by ordinary visual means and is difficult even with the aid of a powerful microscope. Prior visual means of examining paint films for fissures have proven unsatisfactory because of the difficulty of lighting and focusing a magnifying device on film specimens. The present electrical system of measurement is infinitely more satisfactory and technically correct.

It has been proposed to determine the characteristics of film coatings by applying paint or other coating composition films to a panel and flexing the panel over a mandrel, followed by visual examination of the specimen, but in practice this somewhat crude method is attended with a number of practical difficulties, as heavily pigmented films obscure the performance of the film forming vehicles to such an extent that a brittle cold solvent cut resin of good adherence can pass the mandrel flexibility requirements and minute fissures of sufficient breadth to admit dew or moisture to the subsurface could be produced but cannot be detected, and consequently the coating material may pass these prior distensibility tests and yet permit rusting of the under surface in actual service. Thus a paint film is unsatisfactory for commercial use if on distension the film separates instead of stretching. With the present method and apparatus standardizing test data can be readily obtained even by the unskilled worker and material gathered which gives the paint manufacturer information on his product heretofore unobtainable, so that paint films of different formulae for various purposes can be improved and standardized.

In carrying out the present method, a novel and easily operated apparatus has been developed as disclosed in the accompanying drawings and specification.

In the drawings:

Fig. 3 is an enlarged sectional view taken on line 3—3 of Fig. 1;

Fig. 4 is a further enlargement of the film rupturing portion of the apparatus shown in Fig. 3 and illustrated diagrammatically in the electrical circuit set up when rupture occurs;

Fig. 5 is an enlarged plan view of a typical specimen after testing, showing the nature of the cracks or fissures in the paint film;

Fig. 6 is a cross-sectional view taken on line 6—6 of Fig. 3;

Fig. 7 is an enlarged sectional view taken on line 7—7 of Fig. 1, illustrating the reversing mechanism;

Fig. 8 is a cross-sectional view taken on line 8—8 of Fig. 7;

Fig. 9 is a diagrammatic view showing the electrical connections between motor, limit switches and control levers; and Fig. 10 is an elevational view illustrating a modified form of the invention in which a beam of light is transmitted through the test block thus permitting the use of a microscope to examine the specimen under test.

Figure 1:
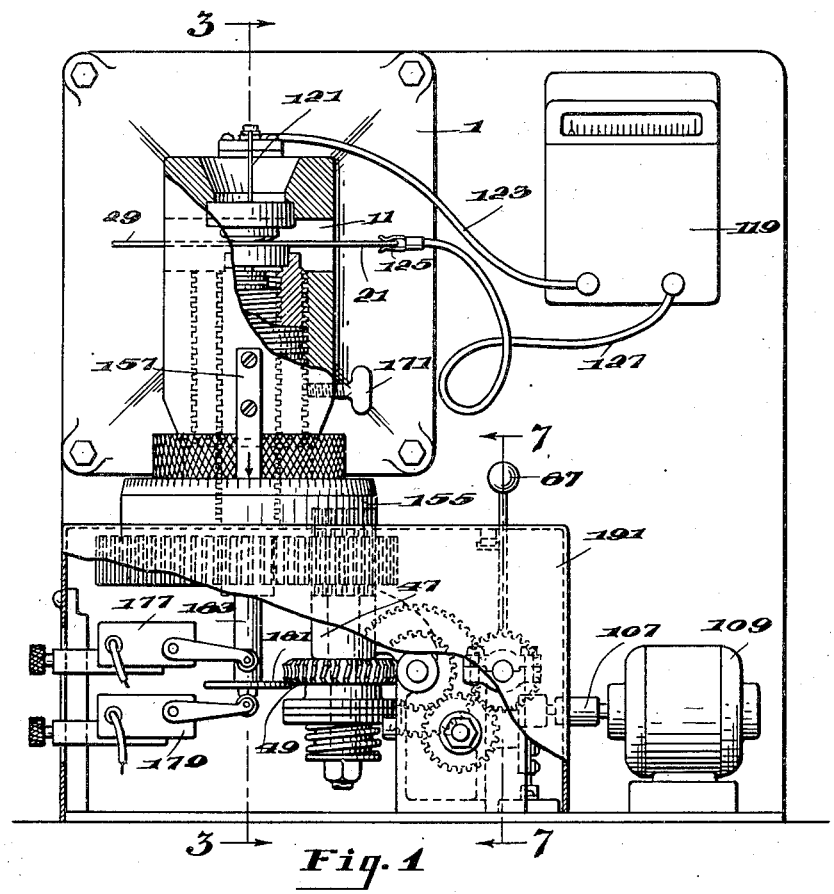
Fig. 1 is a front elevational view of the apparatus with parts broken away to more clearly illustrate certain features.

A vertically positioned rear panel 1 is provided with a horizontal base 3 attached thereto for supporting the various parts of the testing apparatus. Mounted in an outwardly extending arbor or bracket 5, secured to the end portion of the rear plate 1 is a vertically positioned hollow cylinder 7 having an internally threaded bore 9 extending from the lower edge of the cylinder 7 to an enlarged transverse slot or opening 11. A flared opening 13 extends downwardly from the upper end of the cylinder 7 and joins the annular recess 11. Interposed between the bottom edge of the upper flared opening 13 and the enlarged annular recess 11 is an apertured clamp or die block 15 secured in an enlarged opening 17 in the upper wall of the annular recess 11. This clamp block 15 is made of insulating material such as glass or a translucent resin possessing sufficient structural strength to form one side of a die block or clamp against which the test panel is positioned. The insulating block 15 is centrally apertured at its lower portion 19 forming a well for the introduction of tap water or other electrolyte therein, while the upper wall of the aperture is flared and joins the lower end of opening 13 in the outer cylinder 7.

The lower or movable wall of the clamp or die plate cooperating with the upper block 15 comprises a cylindrical platform 21 set in a circular opening 23 cut in the upper end of an internally and externally screw threaded sleeve or cylinder 25. The screw threaded sleeve 25 is threaded within the cylinder 7 and provides the means for moving the lower die block 21 into clamping position relative to the upper apertured die block 15.

A test panel 27, shown in enlarged detail in Fig. 4, is provided with a film of coating material 29 on its upper surface and this is the film to be tested for elongation. The force applied to the under side of the metal test panel 27 carrying the test film 29 is secured by a rounded end ram or tool 31 adapted to be projected upwardly against the lower side of the test panel 27 through opening 33 formed in the cylindrical platform 21. The projectable tool or spindle 31 preferably takes the form of a comparatively small diameter pin having a rounded upper end and attached to a disc 34 having an enlarged lower spindle 35 rotatably positioned in the bore or socket 37 formed in the inner externally threaded screw 39. It is preferably to mount the spindle disc 34 on an anti-friction bearing 41' secured in a shouldered recess formed in the upper end of the screw 39 so that the tool or spindle 31 will be freely rotatable. The lower end of the inner screw 39 which cooperates with and is movable relative to the outer threaded cylinder 25, is keyed to an externally toothed horizontal gear 41 adapted to be rotated in either direction by a pinion 43 meshing therewith. This pinion 43 is mounted on a vertical shaft 45 held in bearing block 47. It will be observed that the pinion 43 is of considerably greater length than the width of the gear 41 with which it meshes, so that the teeth of the respective gears will always be in mesh regardless of the position of the gear 41 on its attached screw 39.

Figure 2:
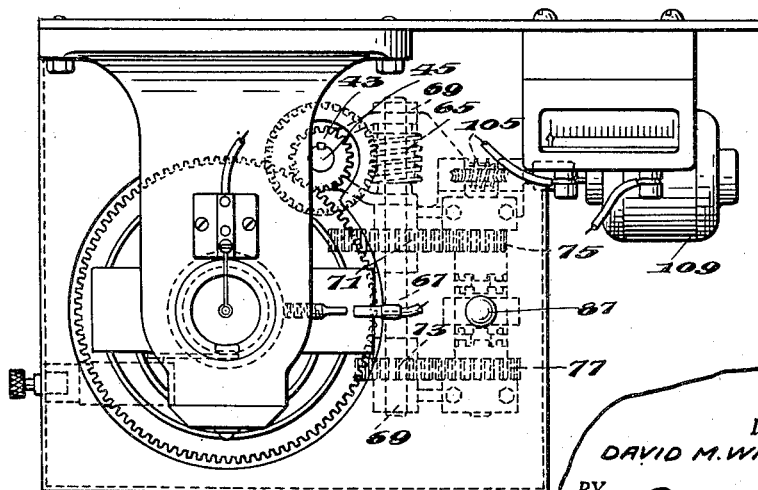
Fig. 2 is a plan view of the apparatus shown in Fig. 1.

Rotative movement in both clockwise and counterclockwise direction is given the pinion shaft 45 through rotation of worm gear 49, which is freely mounted on the lower end of the shaft 45 and drives the latter through friction clutch assembly 51. This friction clutch assembly is of conventional design, and includes a flanged collar 53 secured to the under side of the worm gear 49 with the enlarged annular portion thereof resting against a friction disc 55 carried by a flanged cylinder 57 keyed to the lower end of the shaft 45. The requisite amount of frictional tension between the flanged members 53 and friction device 55 on flange 57 is provided by coil spring 59 bearing against the under side of the flange member 57, whereby the tension of the spring thereagainst may be readily regulated by adjusting the end nut 61 carrying washer 63 and forming the base for the lower end of the coil spring 59. Worm gear 49 is rotated in either direction by engagement with the worm 65 carried on horizontal shaft 67. This shaft 67 is supported in spaced bearing blocks 69 resting on the base plate 3 and the worm 65 is restrained against longitudinal movement by positioning the worm 65 within the side bearings 69 as best shown in Fig. 2. The shaft 67 is rotated through drive gears 71 and 73 which are selectively engaged by pinion 75 or through drive gear 77, respectively, which are freely mounted on a spaced, parallel shaft 79, carried in bearing brackets 81. A freely rotatable reversing gear 83 is carried on a stub shaft 85 mounted through one side bearing bracket 81 and is driven by engagement with gear 77 so as to transmit power from shaft 79 in a reverse direction to drive gear 73 and shaft 67.

A hand control lever 87 for applying power from shaft 79 to shaft 67 is pivotally mounted on a horizontal pin 89 and carries a stud 91 for engagement with annular recess 93 formed in a slidable toothed clutch collar 95 that is keyed to the shaft 79 and permits selective engagement of the end teeth 97 with teeth 99 and 101 formed on the adjacent ends of pinion 75 and gear 77, respectively. Power is applied to the power shaft 79 through worm gear 103 driven by the worm 105 carried on the motor shaft 107 of the electric motor 109.

By this drive arrangement, as will be hereinafter more fully described, the outer threaded cylinder 25 and inner screw 39 are projected or backed away from the outer apertured die block 15. As before stated, the test panel 27 having a coating 29 thereon to be tested, is positioned between the upper and lower die blocks or clamping members 15 and 21, and by operation of outer threaded cylinder 25 is secured therebetween. Movement is imparted to the central screw 39 to project the testing tool or spindle 31 against the under side of the test panel, as shown in enlarged fragmental view Fig. 4. The spindle 31 is projected upwardly to indent or bend the test plate 27 and film 29, as enlarged at 115, and the upward pressure on the tool and test plate is maintained until the test film 29 develops minute fissures sufficient to permit water or other electrolyte 117, which has been placed in the bottom aperture 19 of the test block 15 to seep through the ruptured film and contact the metal 27 of the underlying test plate. These fissures are very small and are not readily discernible either to the eye or by the use of a microscope unless it is of very high magnification. However, by creating an electrolytic circuit, including a galvanometer or microammeter 119 in a circuit completed by the contact of the water or other electrolyte 117 with the base metal 27, a most sensitive recording can be accomplished. This measuring circuit includes ring-like electrode 121 projecting into the aperture 19 from the upper dielectric clamping block 15 and which is connected by suitable wiring 123 to the microammeter 119. The other lead comprises a clamp 125 which is adjustably connected to the metal test plate and connected by suitable wiring 127 to the microammeter, and the circuit is completed and energized by the galvanic cell established when the electrolyte contacts the test plate. Change in the deflection of the galvanometer needle indicates to the operator that the paint film has been elongated beyond its elastic limit and is ruptured. When it is desired to examine the fissures or the progress of the elongation of the test film 29 as the tool is projected into the test plate, a microscope, denoted by numeral 135, may be mounted above the apparatus so that the microscopic lens is positioned immediately above the surface of the electrolyte 117, and by forming the upper clamp or die block 15 of transparent material a lateral beam of light from projector 137 will penetrate the wall of the transparent clamping block 15 to illuminate the examination area. This visual arrangement is illustrated in Fig. 10.

In operating the apparatus and for the purpose of clamping the test plate 27 with its film 29 thereon within the machine, and to project and measure the projection and travel of the elongation tool 31 against the under side of the test plate, a milled ring 155 is frictionally attached to and carried on the upper surface of the horizontal drive gear 41, the ring being divided throughout its peripheral length by suitable indicia, such as 1/100 millimeter gradations. These markings cooperate with a fixed marker or zero arrow 157 attached to the front of the stationary cylinder 7. A push ring 159, of greater diameter than the lower flanged portion 161 of the screw threaded cylinder 25 is retained thereabout by a fixed pin 163 having a coil spring interposed between the outer periphery of the lower flange 161 and the inner periphery of the enlarged ring 159. Diametrically opposite to the axis of the pin 163 is a bore 165 extending through the flange section 161 of the outer screw threaded cylinder 25 and inwardly to approximately the center line of inner screw 39. A slidable block or dowel 167 is carried in this bore and the outer end thereof is secured to the ring 159 by a screw 169. This construction forms a locking means between the inner screw threaded tool projecting ram 39 and the outer screw thread cylinder 25 whereby when the slidable pin or dowel 167 is disengaged from the bore 165 by pressing the opposite portion of the ring 159, rotation of gear 41 by pinion 43 will feed the tool ram 39 only upwardly. To insure that any friction drag between the threaded ram 39 and threaded cylindrical cylinder 9 does not also rotate this outer cylinder 9 when it is desired to rotate only the ram, a thumb screw 171 is threaded through the casing 7 for binding against the cylinder 9 to prevent rotation.

The constant speed motor 109 is connected in a suitable power circuit as shown in Fig. 9 and current thereto is controlled by a switch 175. To prevent the tool 31 from overrunning and also to prevent the screw ram 39 from descending too great a distance, a pair of conventional pivoted contact limit switches 177 and 179 are positioned with their contacting arms on either side of a disc 181 attached to the end of a rod 183 secured to the lower end of the inner screw member 39. As shown diagrammatically in Fig. 9, these limit switches when operated by contact with the disc 181 will break the current supply to motor 109 and stop operation of the apparatus. The motor circuit for either the "up" or "down" position of the cylinder 39 or ram 25 is completed by a contact 185 secured to the lower end of the pivoted hand lever 87 so that in either position of the lever the contact 185 completes the circuit through oppositely spaced contact members 187. The pivoted hand lever 87 projects upwardly through the top wall 189 of a casing 191 surrounding the gearing heretofore described and the limit switches to protect these elements from dirt and breakage. A spring finger 193 is placed beneath the upper wall 189 of the casing and cooperates with a transverse pin 195 secured to the lever below the top wall and thus normally maintains the lever in neutral position, although the lever is easily disengaged from the finger 193 when it is desired to move the lever to either the "up" or "down" position, whereupon the clutch dog 95 is thrown into selected position by movement of the lug 91.

When it is desired to test the elongation factor or distensibility of a film of coating material 29 applied to a metallic test plate 27, the apparatus will be assumed to be in a position wherein the bottom die or clamp plate 21 carried on the upper end of the screw cylinder 9 is backed away a short distance from the upper die block or clamp member 15, and with the upper end of the rounded tool 31 level with the upper surface of the die plate 21. A test plate with the film to be tested thereon is then placed on the upper surface of the die block 21 and extends through the transverse opening 11 formed in the upper portion of the vertical pedestal of the apparatus. Thereupon, the hand lever 87 is shifted to its "up" position to energize shaft 45 through the slip clutch 51 and gears 75 and 71. This action rotates the elongated vertical pinion 43 meshing with horizontal gear 41 and because of the locking pin 165 will transmit rotary motion to the outer screw threaded cylinder 25 from the screw ram 39. As the rotation of these members continues the test plate will be moved upwardly until it contacts the under side of the upper die block 15 and continued upward movement will be arrested through the action of the slip clutch unit. The operator then places the hand lever in neutral position and after locking the outer screw threaded cylinder 25 by means of the thumb screw, 175 adjusts the gradations of the micrometer ring 155 to zero position in cooperation with the marker 157 by sliding the ring on the gear. Thereafter the ring 159 is pressed rearwardly to disengage the dowel 167 from the bore 165 and the hand lever 87 is again shifted to transmit motion as before to the gear 41. Inasmuch as the outer cylinder 25 is now locked, rotative movement is only transmitted to the inner tool ram screw 39, and due to the reduction gearing and pitch of the external thread thereon within the outer cylinder, the tool 31 is slowly moved upwardly against the underside of the test plate. As the tool gradually distends the test plate, the film 29 thereon is also distended or elongated, and this action continues until the coating film begins to crack or develop fissures and the electrolyte 117 in the aperture or well above the distended portion is able to seep through the fissures and contact the metal plate 27, creating a galvanic cell, with the ring electrode and the plate as the dissimilar metals, of sufficient capacity to generate an electric potential, which operates the sensitive microvoltmeter or other testing instrument 119.

It will be appreciated that the tool 31 may continue to be forced upwardly at the wall of the aperture until the film 29 is completely ruptured if so desired, but ordinarily it is sufficient to test the paint film until it develops minute fissures, which are shown in enlarged formation in Fig. 5 and indicated by numeral 115. After a reading is obtained on the microammeter the hand lever 87 can be shifted to neutral position and the gradations on gauge 155 read and correlated in any desirable manner to give a standardized test to indicate degrees of elongation, etc. Through the gearing previously described the test plate can be readily removed by reversing the movement of the mechanism through the gearing by engaging the teeth of the clutch dog 95 with gear 74 to reverse the movement of shaft 67 and lower the screw projected tool. The outer cylinder may also be lowered by engaging the member 165 with the slidable lock pin 167 and releasing the thumb screw 177, whereby the outer cylinder is rotated and brings with it the inner screw arm 39.

It should be understood that the operation of the apparatus and method of the present invention each depends upon the difference of potential resulting from the contact between the electrolyte and the base metal, which first occurs when the coating is separated only sufficiently to permit moisture penetration. Actually the instrument reading is a combination of two contact potentials, i. e. electrode-electrolyte and electrolyte-base metal. These may be additive or otherwise dependent on the relative electromotive potentials of base metal and electrode, the latter being selected for universal use when possible.

With this arrangement of parts and a meter whose mere change in reading indicates a breakdown in the paint film it is possible also to test electrically conducting paint films such, for instance as aluminum paint on a steel base. Originally and with the paint film intact the meter will give a reading of the combination electrode-electrolyte-film potentials and this will be changed when there is combined with it the electrolyte-base potential—thus any change in meter reading during film distension is indicative of film rupture.

I claim:

1. In a device for measuring the limit of distensibility of a film of material having one electromotive potential with respect to an electrolyte, and coated onto a sheet of material having another electromotive potential with respect to said electrolyte, including means for distorting a localized area of said sheet in a direction substantially perpendicular to the general plane of said sheet, means for measuring the extent of said distortion, and means reactive when said film passes its limit of distensibility, the improvement in said last mentioned means comprising: a reservoir and an electrolyte confined therein, said reservoir having an opening in its bottom; means holding said sheet to effect closure of said opening with said film in said localized area in contact with said electrolyte; an electrode contacting said electrolyte and formed of material having a different electromotive potential with respect to said electrolyte than either of the materials comprising said film and said sheet; an electrically conductive net work including electrically reactive means connecting said electrode and said sheet and free from any independent source of electrical potential; whereby the breaking of said film upon its being urged past its limit of distensibility causes said electrolyte to contact said sheet to form with said electrode a voltaic cell producing a different potential from that formed between said film alone and said electrode and thereby imposing a change in potential onto said electrical reactive means.

2. Apparatus for determining the distensibility of a film of coating on a metal sheet at a different position in the electromotive series than the film, including means for clamping a localized area of said sheet between insulated ring clamps, means for distorting said area into one of said clamps and measuring the extent of distortion, and means indicative of failure of film distensibility, the improvement in the last mentioned means comprising: an electrolyte in said one insulated clamp contacting said film, an electrode at a different position in the electromotive series than the film and sheet contacting said electrolyte, a voltmeter type instrument directly connected to the electrode and sheet and capable of distinguishing the overall potential between electrode and film from that between electrode and plate when the film is ruptured.

3. In a method for determining the distensibility of a film of material having one electromotive potential with respect to an electrode and coated onto a sheet of material having a different electromotive potential with respect to the electrode which includes the steps of distorting a localized area of said sheet in a direction substantially perpendicular to the general plane of said sheet, terminating said distortion when said film passes its limit of maximum distensibility and measuring the extent of said distortion; the improvement in the step of determining the moment the film passes its said limit; comprising: contacting said electrode and said individual film in said localized area with an electrolyte, measuring the value of any potentials so created through said electrolyte, permitting the electrolyte to pass through said film and contact said sheet when the film passes its limit, noting any change in value of potential then created through said electrolyte and utilizing the occurrence of said change to indicate the instant the film passes its limit of distensibility.

DAVID M. WILLIAMS.

REFERENCES CITED

The following references are of record in the file of this patent:

UNITED STATES PATENTS

| Number | Name | Date |
| --- | --- | --- |
| 1,094,319 | Erichsen | Apr. 21, 1914 |

FOREIGN PATENTS

| Number | Country | Date |
| --- | --- | --- |
| 705,690 | France | Mar. 16, 1931 |